Dec. 15, 1931.  H. GORANSON ET AL  1,836,320
FRUIT PEELING MACHINE
Filed Oct. 4, 1926   5 Sheets-Sheet 1

Inventors
HJALMAR GORANSON
DAVID GORANSON
By Lyon & Lyon
Attorneys

Dec. 15, 1931.  H. GORANSON ET AL  1,836,320
FRUIT PEELING MACHINE
Filed Oct. 4, 1926     5 Sheets-Sheet 5

Inventors
HJALMAR GORANSON
DAVID GORANSON
By Lyon7Lyon
Attorneys

Patented Dec. 15, 1931

1,836,320

UNITED STATES PATENT OFFICE

HJALMAR GORANSON AND DAVID GORANSON, OF SAN JOSE, CALIFORNIA, ASSIGNORS TO CALIFORNIA PACKING CORPORATION, OF SAN FRANCISCO, CALIFORNIA, A CORPORATION OF NEW YORK

FRUIT PEELING MACHINE

Application filed October 4, 1926. Serial No. 139,355.

This invention relates to a machine for effecting the automatic peeling of fruit or other edible articles. While the invention may be used for peeling fruit of any kind, it is particularly useful as applied to the peeling of pears.

The general object of the invention is to provide simple means for removing the peeling of the pear or other fruit which will operate automatically, and to provide a construction which will enable the machine to have great capacity.

One of the objects of the invention is to provide means for dividing the fruit after it has been peeled, and also to provide means for disposing of the peeling as it comes from the fruit and for guiding the same out of the machine. In its general operation the machine embodying this invention operates to hold the fruit against rotation about its axis while the knives or cutters of the peeling device rotate about the fruit.

One of the objects of this invention is to provide simple means for accomplishing this and for providing for the passage of the fruit past the cutter knives and into a receiver.

One of the objects of this invention is to provide a machine for accomplishing these purposes, having an improved general construction.

In the operation of the machine, we prefer to provide a pusher for engaging the end of the fruit to advance the same past the peeling device, and one of the objects of the invention is to provide simple means associated with the machine for cutting off the end of the fruit to provide a face to receive this pushing means.

A further object of the invention is to provide an improved construction for a holder for holding the fruit to permit the same to be advanced through the holder while held against rotation in being presented to the knives or cutters of the peeling device.

Further objects of the invention will appear hereinafter.

The invention consists in the novel parts and combination of parts to be described hereinafter, all of which contribute to produce an efficient fruit peeling machine.

A preferred embodiment of the invention is described in the following specification, while the broad scope of the invention is pointed out in the appended claims.

In practicing the invention we provide means for holding the fruit and preventing rotation thereof, that is to say, we support the fruit and advance it along its own axial line. We also provide a cutter with means for rotating the cutter around the axis of the fruit while held in contact with the fruit; we provide means operating as the cutter rotates around the fruit to produce a relative movement of the cutter and the fruit longitudinally of the said axis. In the present instance, we provide a plurality of means of this character enabling a number of fruits to be operated upon simultaneously. In order to accomplish this, the peeling devices are preferably constructed as a plurality of units mounted on a rotary table, and we shall now proceed to describe a machine of the preferred construction and of this rotary type.

Figure 2:
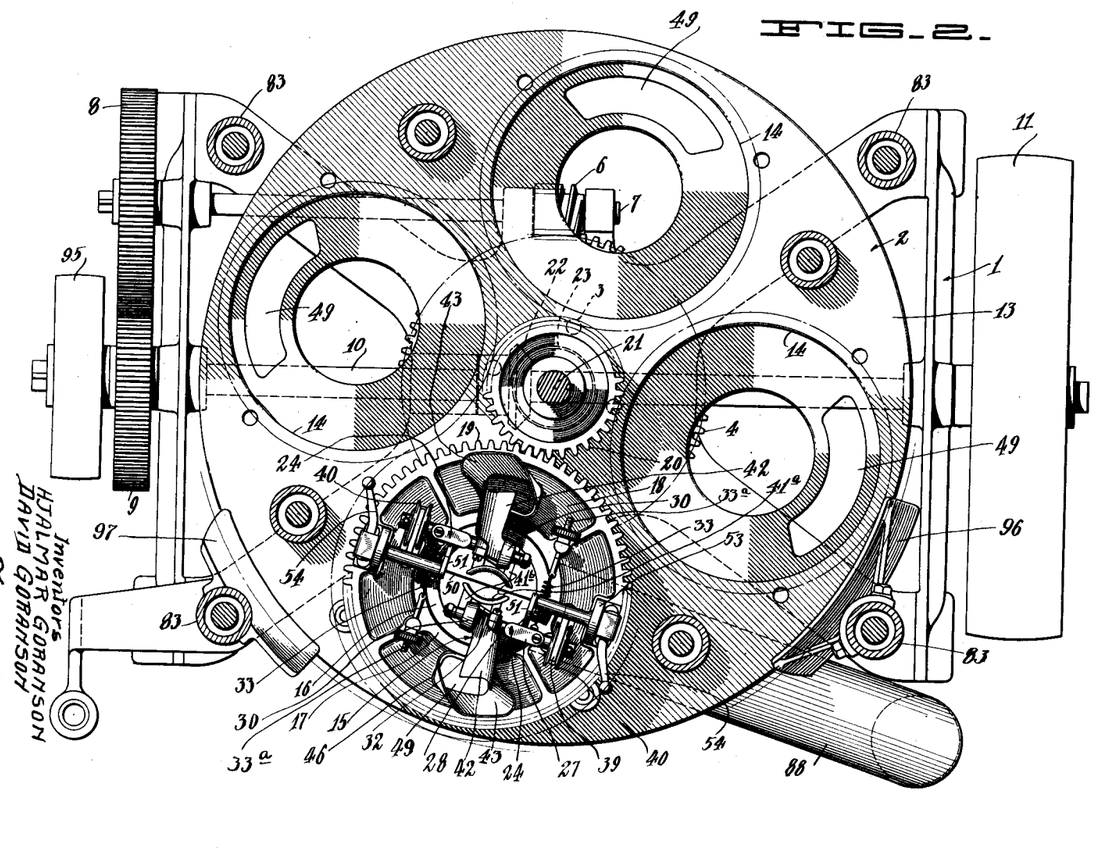
Figure 2 is a cross section through the machine, taken about on the line 2—2 of Fig. 3, but showing the details of only one of the peeling devices, the other peeling devices being omitted from the rotary table.

This machine includes a frame 1 which supports a rotary table 2 which is mounted to rotate on a ball bearing 3. Any suitable means may be provided for rotating the table. In the present instance this is accomplished by means of a worm wheel 4 formed integral with the nave or hub 5 of the table and meshing with a worm 6 (see Figs. 2 and 3). This worm is carried on a worm shaft 7 carrying a gear wheel 8 which is driven from a gear 9 on the main shaft 10 of the machine. This main shaft 10 may be driven by a pulley 11.

We shall now proceed to describe one of the peeling devices. These are mounted on the table and there may be as many of them as desired. In the present instance we have illustrated four of these peeling devices.

The rotary table 2 preferably comprises a lower part or lower plate 12 and an upper part or plate 13. The lower plate 12 is provided with a plurality of openings 14 (see Fig. 2), and in each of these openings one of my peeling devices 15 is mounted. These peeling devices are of a rotary type and in order to support them and facilitate their operation, we prefer to provide each opening 14 with a fixed tubular arbor 16. On each arbor a peeling device is mounted to rotate. Each peeling device comprises a tubular sleeve 17 (see Figs. 3 and 4) which fits over the tubular arbor and this sleeve forms the hub of a rotary carriage 18. The body of this carriage 18 carries, or is formed as, a gear wheel 19, the teeth of which mesh with a central driving gear wheel 20 which is mounted on a central shaft 21 for the rotary table, the said shaft 21 passing up through the ball bearing 3. This shaft 21 is driven from the main shaft 10 through suitable bevel gears 22 and 23 (see Figs. 2 and 3).

Figures 5, 6:
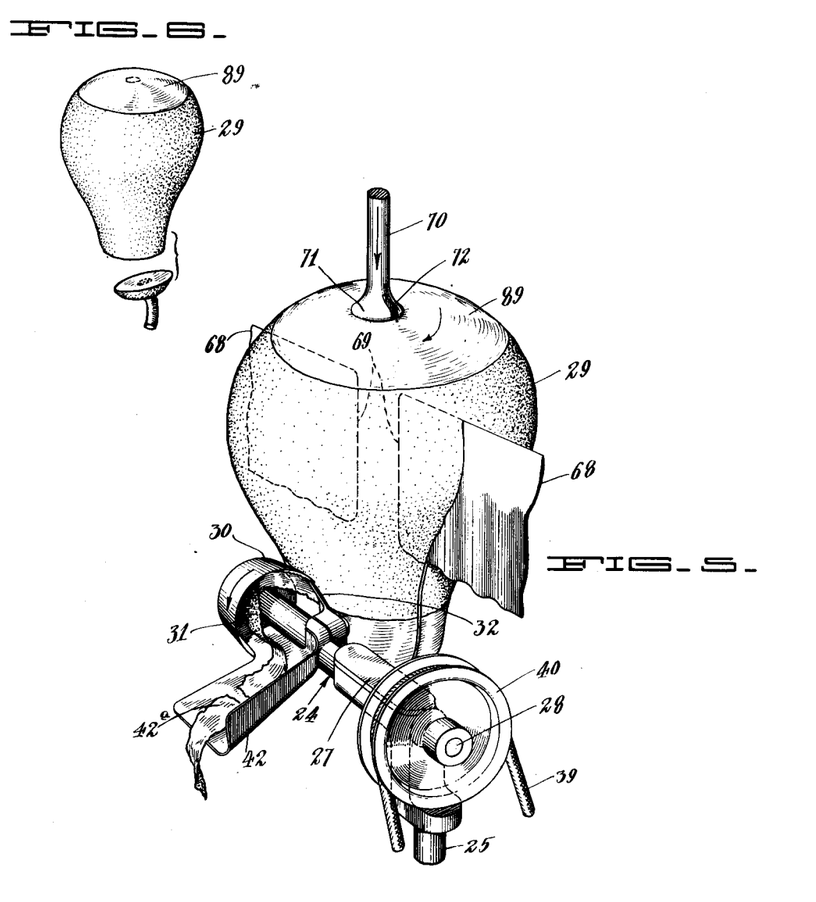
Figure 5 is a perspective showing the pear in the relation which it has with respect to the cutter which removes the peeling. This view indicates details of the means for holding the pear and preventing its rotation.
Figure 6 is a perspective showing a pear after its ends have been cut off by the auxiliary cutter preparatory to placing it in the holder to be peeled by the peeling mechanism.

On the rotary carriage 19 we mount movable knives or cutter devices 24 (see Fig. 5). Each of these cutters is mounted to swing on its own axis or pivot 25 (see Fig. 3), that is to say, each cutter can swing on its axis in a plane transverse to the central axis 26 of the peeling device. In other words, each cutter device comprises a pivoted arm 27 and each arm carries a longitudinal cutter shaft 28. On these arms a curved knife or cutter is mounted which is held in contact with the fruit 29 (see Fig. 5) during the peeling operation. Each of these cutters 30 is of arcuate form and preferably of annular form, and is a short frustum of a cone, the cutting edge 31 being disposed at the large end of the cone.

On the arm 27 is formed a guard or gauge 32 which is held against the face of the fruit adjacent the point where the cutting edge 31 engages the peel and separates it from the body of the fruit. In order to hold these cutters 30 in contact with the fruit, we provide each cutter arm with a coil spring 33 which pulls the cutters yieldingly inwardly toward the longitudinal axis of the carriage. This will maintain the cutting edge of the cutter yieldingly in contact with the fruit. These springs are attached to screws 33a for regulating this tension.

In order to rotate the cutter shafts 28, we provide for driving the same from a relatively fixed part, that is to say, a part which is fixed on the rotary table. This part is preferably in the form of a driving ring 34 (see Figs. 3 and 4). This driving ring is held fixed on the table by means of suitable posts 35. It has bevel gear teeth on its under side and those teeth are engaged by pinions 36 which are attached at diametrically opposite points on brackets 37 attached to sleeve 17. Each pinion 36 is constructed at one end into a belt pulley 38 and from each belt pulley 38 a round belt or cord 39 passes up and around a corresponding belt pulley 40 carried by the corresponding cutter shaft 28.

With this arrangement it will be evident that as the rotary table revolves, the carriages 18 will be rotated on the tubular arbors 16 and as they rotate, movement will be imparted from the relatively fixed rings 34 on the table to the cutters 30.

Each cutter is provided with a guide 42 for guiding off the peeling 42a as it is cut from the fruit. These gutters or guide spouts 42 extend over to one side and each spout delivers the peeling into a corresponding hopper 43 (see Figs. 3). These hoppers are supported on a ring 44 mounted on rollers 45 which roll around on the upper face of the relatively fixed driving ring 34. These hoppers are set in openings 46 formed in the upper part of each rotary carriage.

In order to facilitate the movement of the peeling down through the hoppers 43 and out of the machine, we provide means for agitating the hoppers as the rotary carriages rotate. For this purpose we provide the upper face of the fixed ring 34 with a plurality of short cams 47. As each carriage rotates, the rollers 45 run up these cams and fall off of them so as to produce a jogging or agitation of the hopper. The lower end of each hopper delivers into a relatively fixed pan 48 carried on the rotary table, and at one side the rotary table has an outlet opening 49 through which the peelings will fall. In this connection, it should be understood that as the hoppers are rotating, their lower ends which project into the pan 48 will constantly bring the peelings around past the outlet 49 so that they will eventually descend through this opening.

In the operation of the machine, the fruit forces the cutters apart as it passes between them, and it passes on down through the tubular arbor 16. As it does so, it is divided into two halves by a knife 50 which extends diametrically across the upper end of the tubular arbor (see Fig. 4).

Figure 3:
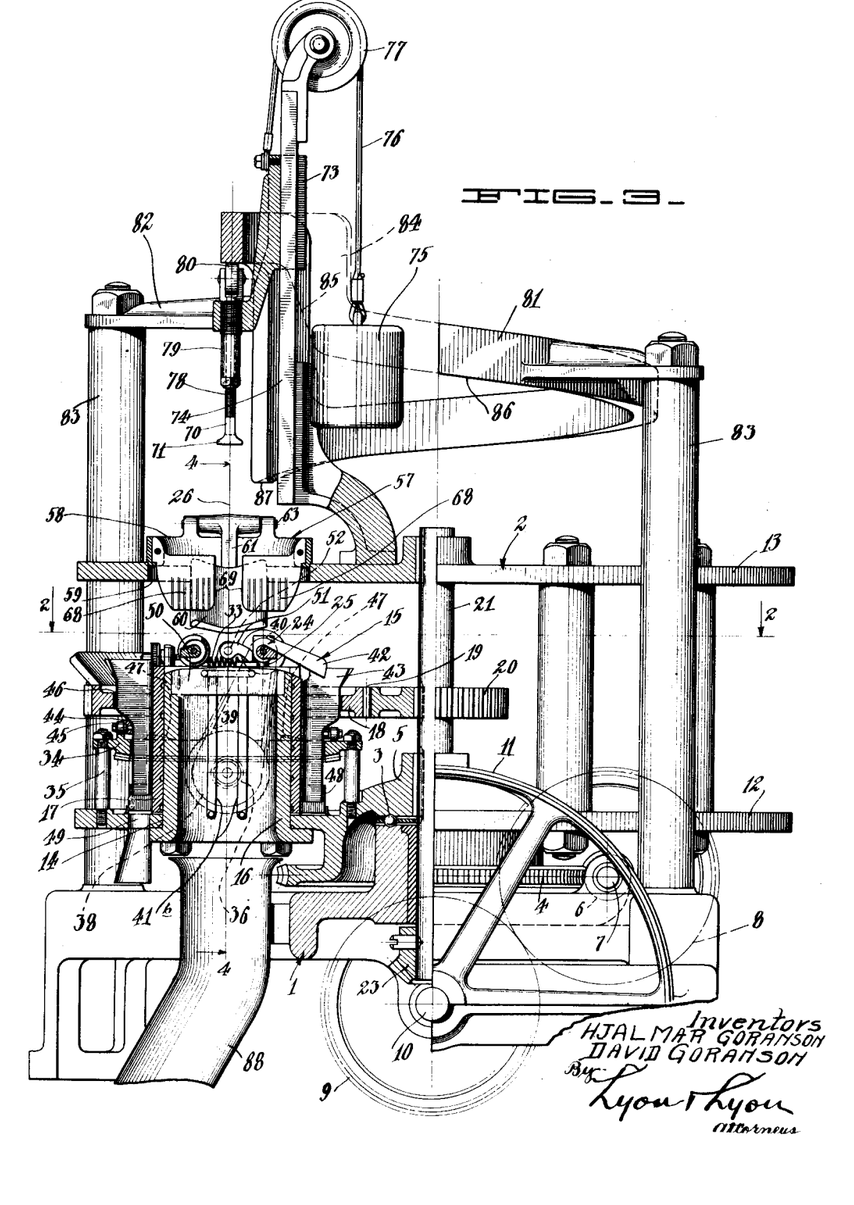
Figure 3 is a side elevation in partial section through the machine illustrated in Figs. 1 and 2, one of the peeling devices and its corresponding holder being shown in vertical section. Other parts of the mechanism are broken away.

We provide stops for limiting the inward movement of the cutter arms 27 under the action of their springs 33. These stops are preferably movable and each stop is in the form of a finger 51 which is rigidly attached to a stop shaft 52 mounted in a bracket 53 carried on the upper side of the carriage 18. Each shaft 52 may be rotated at will by means of a suitable handle 54. In Fig. 3 one of these stops is shown in position to limit the inward movement of the cutter arm 27. Evidently by swinging this stop finger 51 upwardly, it will be thrown out of the path of the arm and the inward movement of the arm will then be unlimited.

The inner face of the sleeve or hub 17 of each carriage may be provided with oil grooves 55 which assist in providing lubrication between the wearing surface of the sleeve and the fixed arbor 16. The upper end of the fixed arbor is preferably provided with a chamfered face 56. This face is below the end of the sleeve 17 so that a shallow channel for oil is formed at this point. When this channel is filled with oil, the oil moves slowly down between the rubbing surfaces and will keep the grooves 55 filled.

Figure 4:
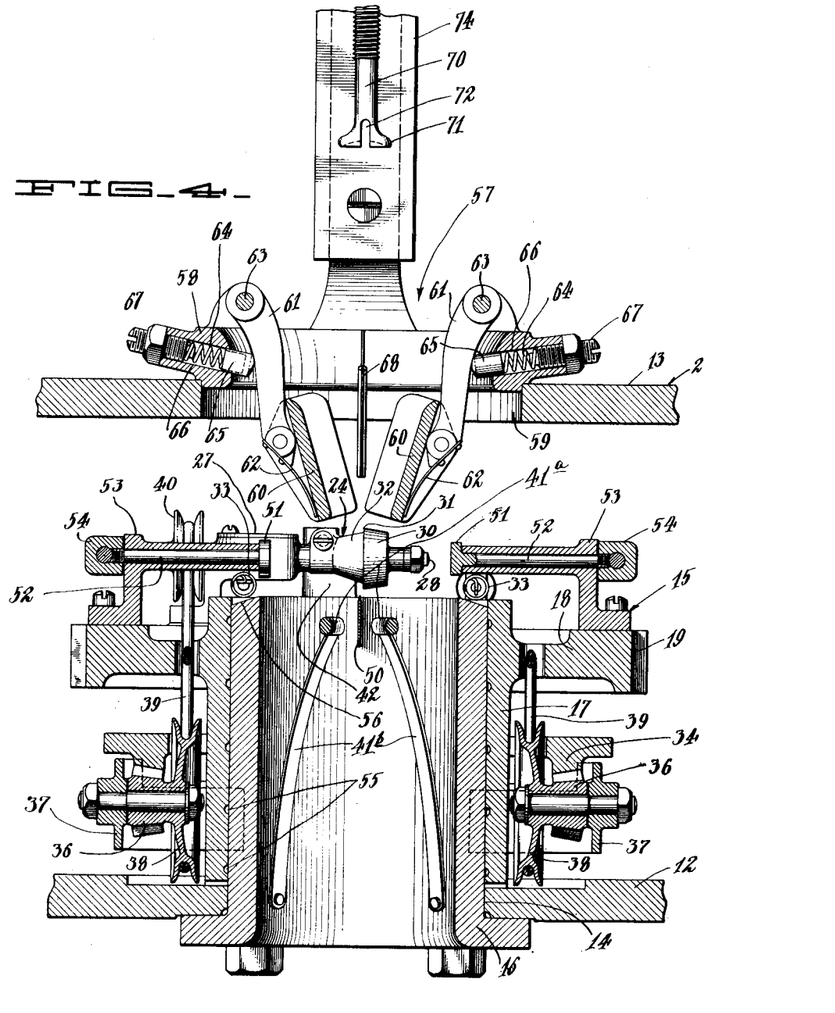
Figure 4 is a vertical section taken about on the line 4—4 of Fig. 3, but upon an enlarged scale.

Over each of the rotary peeling devices we provide a fruit holder 57 (see Fig. 4). This holder is constructed in such a way as to guide the fruit as it passes downwardly and it holds the fruit against rotation while permitting its end to project between the knives or cutters 30 which remove the peeling. For this purpose each holder preferably comprises a ring 58 which is set in a corresponding opening 59 in the upper plate 13 of the rotary table. Each holder is also provided with two converging saddles 60 between which the fruit passes, the said saddles being disposed on opposite sides of the central axis of the peeling device. These saddles are pivotally supported on arms 61 which are pivotally mounted on the ring 58 and converge toward each other. In order to hold the saddles 60 in their converging relation, each arm 61 is provided with a leaf spring 62 which presses against the lower end of the saddle. These saddles are concave on their inner faces so as to fit the contour of the fruit.

The ring is provided with means for yieldingly pressing the arms 61 inwardly, and the pivots 63 of these arms permit them to move inwardly toward the fruit or away from the fruit as the fruit passes between the saddles.

In order to press the arms 61 yieldingly toward the fruit, the ring 58 is provided back of each arm with a spring 64 which thrusts against a plunger 65 mounted at the inner end of the bore 66 which houses the spring. The outer end of each spring seats against an adjusting screw 67, by means of which the compression of each spring can be adjusted.

Means is provided for preventing the rotation of the fruit on its axis, that is to say, on the axis of the rotary carriage 18. For this purpose we prefer to provide each side of the ring 58 with a short plate or impaling blade 68. These blades are quite thin. They are preferably straight, that is, uncorrugated, at their upper edges, but toward their lower edges they have corrugations extending in the direction of movement of the fruit, that is to say, they have vertical corrugations that operate to prevent the halves of the pear from slipping laterally on the blade, (see Fig. 5). In other words, these blades project in from diametrically opposite sides of the ring, but their adjacent edges 69 do not engage with each other, so that the core of the fruit is not cut through.

In order to produce the downward or advancing movement of the fruit through the holding device 57 and past the peeling device, we prefer to provide a pusher stem 70, the lower end of which is enlarged into a head 71 to engage the upper face of the fruit, and if desired this head may be provided with a slot 72, to receive the inner ends of the impaling blades 68.

This pusher stem is carried on a pusher body or block 73 which is mounted to slide vertically on a guide bracket 74 which is secured to the upper plate 13 of the table. This block and pusher stem are held up against a cam 80 by a weight 75 suspended on a cord 76 that passes over a pulley 77 mounted at the upper end of the bracket or guide 74, the other end of the cord being attached to the upper end of the pusher block 73. The stem 70 is provided with threads 78 for adjusting the same within a bushing 79 which is threaded into the lower end of the pusher block, and the upper end of this bushing is forked so as to carry a roller 80. Suitable means is provided for pressing this pusher block down as the table rotates, to advance the fruit through the holder and through the peeling device. This is preferably accomplished by means of a continuous cam 81 which is provided with radial arms 82 for securing it to posts 83 on the frame. This cam is partially shown in full lines. The dotted lines 84 however indicate the portion of the cam which the roller 80 will ride on immediately after leaving the position in which it is indicated in Fig. 3.

In this connection it will be noted that this cam has a "quick" face 85 which moves the stem 70 quickly downwardly to engage the end of the fruit set in the holder, and beyond this "quick" face, the cam has a "slow" face 86 which has a substantially uniform pitch around the whole circumference of the machine; while the roller 80 is running on this portion of the cam, the fruit is moving relatively slowly through the peeling machine. At its end the cam is provided with a downwardly projecting toe 87 and when the roller reaches this point, the cam gives the stem a final push, which effects the ejectment of the fruit from the peeling machine, causing it to move completely past the dividing knife 50. When the peeling device has reached this predetermined point in the machine, the peeling device will be located over receiving means such as a spout or receiving tube 88 (see Fig. 3). The fruit will therefore descend into this spout and be directed out of the machine into a suitable container.

As the pear passes the knife 50, the halves into which it is being divided are held together by a pair of curved yokes 41a carried in the upper ends of leaf springs 41b secured at their lower ends on the inner side of the arbor 16. Two cams 96 and 97 are provided (see Fig. 3) to control the opening between the cutters 30.

Figure 1:
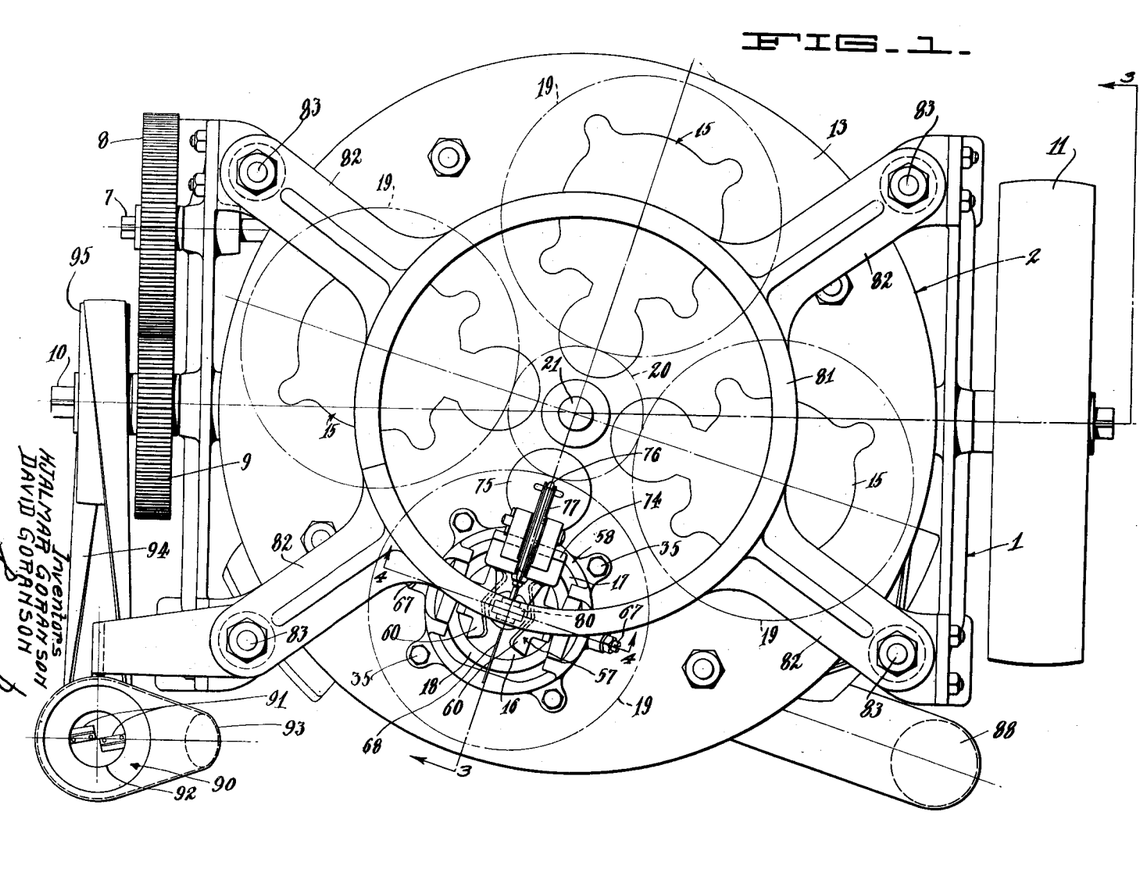
Figure 1 is a plan of a machine embodying our invention. This view shows the details of only one of the peeling devices, the other peeling devices being indicated merely in outline.

Referring to Fig. 6, it will be noted that the upper end of the pear is cut off so as to form a face 89. In a similar way the lower end of the pear adjacent the stem is cut off as indicated in Fig. 6. In order to cut off the ends of the pear in this way, we provide a rotary cutting device 90 (see Fig. 1). This cutting device may comprise a pair of knives 91 which rotate within an opening 92. The end of the pear is thrust into this opening. The opening limits the distance to which the pear can project into the knives. If desired, this cutting device may be made doubleended, the upper end 93 being used for the small end of the pear and the lower end having the opening 92 being used for the large end. This auxiliary cutting device may be driven by a belt 94 off a belt pulley 95 on the main shaft of the machine.

We shall now describe the general mode of operation of the machine. The fruit, such as a pear, has its ends cut off by means of the auxiliary cutter just described, and the operator of the machine then places the pear in the upper part of the holder 57 which should be opposite to him at this time as the rotary table revolves. The rotation of the machine causes the cam roller 80 to move down the "quick" face 85 of the cam and this depresses the stem 70 sufficiently to enable its head 71 to engage the upper face of the pear, and soon after this occurs, the stem 70 continues a slow downward movement. This causes the impaling blades 68 to engage diametrically opposite points in the periphery of the fruit and keep it from rotating.

As the fruit progresses on down, it passes between the saddles 60 and forces them apart. They operate to hold the lower end of the fruit and then, as they spread apart, they gradually advance relatively upwardly along the side of the fruit. The lower end of the fruit therefore projects down below the lower ends of these saddles and comes into engagement with the cutters 30 which are revolving around the vertical axis of the carriage 18 and which are also revolving on their own shafts. The cutters are yieldingly held in contact with the fruit by their springs 33. As the peeling of the fruit is removed, it is guided in each peeling guide or trough 42 over into its corresponding hopper 43, where it passes down through the body of the carriage and is delivered into the pen 48. As this takes place, the hoppers are jarred or agitated to facilitate the downward feeding movement of the peel. The peel eventually finds its way out through the outlet 49 in the lower table plate 12.

As each pair of cutters 30 pass the cam 96, the arms 54 strike it and this releases the stops 51, thereby permitting the knives to approach each other. This enables the cutters to peel the small end of the pear. This enables a very small pear to be peeled. The cam 97 moves the arms 54 in a direction to put the stops 51 in operative position, and keeps them from engaging the head 71 as it descends, in case the operator misses one of the holders in inserting the pears.

As the rotary table rotates, the main driving gear 20 at the center of the table is rotated so as to produce a rotation of each carriage around its own axis. As each carriage rotates, the pinions 36 rolling on the under side of their corresponding drive rings 34 will be rotated and this will drive the belts 39 which drive the pulleys 40 on the shafts 28 of the cutters 30. In this way, the cutters will be rotated.

As each fruit holder 57 passes under the toe 87 at the end of the cam, the cam gives the fruit the final push which causes the knife 50 to cut it in two, and the halves of the pear then fall down through the tubular arbor 16 and pass into the receiving spout 88 which directs the peeled and divided fruit over to one side. The knife 50 also operates as means beyond the cutters to prevent rotation of the fruit as it passes out of the fruit holders.

It is understood that the embodiment of the invention described herein is only one of the many embodiments this invention may take, and we do not wish to be limited in the practice of the invention, nor in the claims, to the particular embodiment set forth.

What we claim is:

1. In a fruit peeling machine, the combination of means for holding the fruit, oppositely disposed impaling blades for cutting into the fruit to prevent its rotation, a peeling cutter located beyond the impaling blades with respect to the direction of advance of the fruit, means for supporting the cutter in contact with the fruit and for rotating the same around the fruit on an axis, a pusher stem located on the said axis of rotation, and means for guiding the pusher stem to move longitudinally along said axis of rotation, said pusher stem being capable of engaging the fruit and advancing the same past the plane of the cutter.

2. In a fruit peeling machine, the combination of means for holding the fruit and preventing rotation thereof on its axis, a rotary cutter, means for rotating the cutter on its own axis, means for holding the cutter in contact with the fruit, means for rotating the cutter around the axis of the fruit, a pusher stem cooperating with the first-named means to advance the fruit and prevent its rotation, guiding means for the pusher stem located in line with the last named axis for guiding the pusher stem to move longitudinally along the axis, said pusher stem being capable of engaging the fruit and advancing the same past the plane of the cutter.

3. In a fruit peeling machine, the combination of means for holding the fruit, oppositely disposed impaling blades for cutting into the fruit on opposite sides to prevent its rotation on an axis, a rotary carriage mounted to rotate on the said axis, a cutter carried thereby, means for holding the cutter in contact with the fruit, a pusher stem, guiding means for the pusher stem located in line with the said axis, said pusher stem being capable of engaging the fruit and advancing the same past the plane of the cutter.

4. In a fruit peeling machine, the combination of means for holding fruit, oppositely disposed impaling blades for cutting into the fruit and preventing its rotation on an axis, a rotary carriage, curved cutters mounted on the carriage, means for rotating the carriage on the said axis, means for holding the cutters in contact with the fruit, a pusher stem, guiding means located in line with the said axis for guiding the pusher stem along the said axis, said pusher stem being capable of engaging the fruit and advancing past the plane of the cutter.

5. In a fruit peeling machine, the combination of means for holding the fruit and preventing rotation thereof on an axis, a tubular rotary carriage, cutters carried thereby, means for holding the cutters in contact with the fruit, a pusher stem cooperating with the first-named means to advance the fruit and prevent its rotation, guiding means for the pusher stem located in line with the said axis for guiding the stem to advance along the said axis, said pusher stem being capable of engaging the fruit and advancing past the plane of the cutters.

6. In a fruit peeling machine, the combination of means for holding the fruit and preventing rotation thereof on its axis, a relatively fixed tubular arbor, a rotary carriage mounted to rotate on the said arbor, cutters carried thereby, means for holding the cutters in contact with the fruit, and a pusher stem mounted so that its forward end is capable of engaging the fruit and advancing the fruit longitudinally of the said axis to move the fruit past the cutters and through the tubular arbor.

7. In a fruit peeling machine, the combination of means for holding the fruit and preventing rotation thereof on an axis, a rotary carriage, cutters carried thereby, means for pressing the cutters toward the said axis and into contact with the fruit, means for limiting the movement of the cutters toward said axis, a pusher stem, guiding means for the pusher stem located in line with said axis, said pusher stem being capable of engaging the fruit and operating to move the fruit longitudinally along the said axis and past the cutters, and means beyond the cutters with respect to the direction of advance of the fruit for holding the fruit against rotation on the said axis.

8. In a fruit peeling machine, the combination of means for holding the fruit and preventing rotation thereof on its axis, a rotary carriage, cutters carried thereby, means for holding the cutters in contact with the fruit, means for producing a relative movement of the cutters and the fruit longitudinally of the said axis, means beyond the cutters with respect to the direction of relative advance of the fruit for holding the fruit against rotation on the said axis, and for dividing the fruit.

9. In a fruit peeling machine, the combination of means for holding the fruit and preventing rotation thereof on its vertical axis, a rotary carriage mounted to rotate on said vertical axis, and having a central opening, a cutter arm pivotally mounted on the said carriage so as to swing transversely to the said axis, a cutter carried on the said arm, means for rotating the carriage, means for pressing the arm in a direction to hold the cutter in contact with the fruit, and means in the form of a pusher stem mounted so that its forward end is capable of engaging the fruit for producing a relative movement of the cutter and the fruit longitudinally of the said axis to advance the fruit relatively past the cutter and through said opening.

10. In a fruit peeling machine, the combination of means for holding the fruit and preventing rotation thereof on its axis, a cutter mounted to rotate on its own axis, and having a curved cutting edge disposed on an arc about the axis of rotation of the cutter, means for holding the cutter in contact with the fruit, means for rotating the cutter on the first named axis, means for rotating the cutter on its own axis, and means for producing a relative movement of the cutter and the fruit along the first named axis.

11. In a fruit peeling machine, the combination of means for holding the fruit and preventing rotation thereon on its axis, a rotary carriage, rotary cutters having curved cutting edges, each cutter being mounted to rotate on the axis of curvature of its cutting edge, means for pivotally supporting the cutters on the carriage to swing in a plane transverse to the first named axis, means for rotating the carriage, means for rotating the cutters on their own axes, means for holding the cutters in contact with the fruit, and means for producing relative movement of the cutters and fruit longitudinally of the first named axis.

12. In a fruit peeling machine, the combination of a substantially tubular arbor, means for holding the fruit and preventing its rotation on its axis, a rotary carriage mounted to rotate on the arbor, curved cutters movably mounted on the carriage, means for holding the same in contact with the fruit, means for rotating the carriage, means for producing a relative movement of the cutter and the fruit longitudinally of the said axis, and a knife extending across the tubular arbor for dividing the fruit.

13. In a fruit peeling machine, the combination of a rotary carriage having a central opening, a pair of cutters mounted on the carriage on an axis so as to swing transversely toward the axis of rotation of the carriage, means for rotating the carriage on its vertical axis, means for holding the fruit and preventing its rotation on the axis of the carriage, a pusher stem, guiding means for the pusher stem located in line with said axis, said pusher stem being capable of engaging the fruit and advancing the fruit down past the cutters and through the opening, means for yieldingly pressing the cutters against the fruit and inwardly toward the axis of the carriage and stops for limiting the inward movement of the cutters.

14. In a fruit peeling machine, the combination of a carriage mounted to rotate, said carriage comprising a gear wheel with a depending sleeve, a pair of rotary cutters mounted on the gear wheel to rotate on their own axes, means for holding the cutters in contact with the fruit, means for rotating the carriage, a relatively fixed driving ring mounted on the side of the sleeve with its axis substantially coinciding with the axis of rotation of the carriage, a pinion moving with the carriage and engaging the ring, and a flexible driving connection from the pinion to the cutters for driving the rotary cutters.

15. In a fruit peeling machine, the combination of a rotary carriage, rotary cutters with rotary shafts, movably mounted on the carriage, means for holding the cutters in contact with the fruit, a relatively fixed driving ring in the form of a gear wheel with its axis substantially coinciding with the axis of rotation of the carriage, pinions supported on the carriage for engaging the driving ring, and flexible means actuated by the pinions for rotating the cutter shafts on their axes.

16. In a fruit peeling machine, the combination of a rotary carriage, rotary cutters supported on the carriage to rotate on their own axes, means for holding the cutters in contact with the fruit, a relatively fixed driving ring in the form of a gear wheel, pinions meshing with the driving ring and rotating with the carriage on its axis of rotation, belt pulleys driven by the pinions, belt pulleys carried by the rotary cutters, and belts connecting the pulleys, respectively, to rotate the cutters on their own axes as the carriage rotates on its axis.

17. In a fruit peeling machine, the combination of a rotary carriage having a gear wheel coaxial therewith, means for rotating the gear wheel to rotate the carriage, a pair of cutters movably mounted on the carriage to swing transversely to the axis of rotation of the carriage, means for holding the fruit against rotation and for moving the same relatively past the cutters, a relatively fixed driving ring in the form of a gear wheel, pinions mounted to rotate with the carriage and meshing with the same, pulleys driven by the pinions, respectively, pulleys connected with the cutters, and belts connecting the pulleys for rotating the cutters as the carriage rotates on its axis.

18. In a fruit peeling machine, the combination of means for holding the fruit and preventing rotation thereof on its vertical axis, a rotary carriage mounted to rotate on the said axis, cutters movably mounted on the carriage, means for holding the cutters in contact with the fruit, means for producing a relative movement of the cutters and the fruit longitudinally of the said axis, and means for collecting the peel and directing the same out of the carriage.

19. In a fruit peeling machine, the combination of a rotary carriage mounted to rotate on its vertical axis, cutters movably mounted on the carriage, means for holding the fruit and producing relative movement of the same past the cutters, means for holding the cutters in contact with the fruit, a hopper for collecting the peel mounted to rotate with the carriage, and a relatively fixed pan into which the hopper delivers the peel and having an outlet for the peel.

20. In a fruit peeling machine, the combination of a rotary carriage mounted to rotate on a vertical axis, cutters movably mounted on the carriage, means for holding the fruit and producing relative movement of the same past the cutters, means for holding the cutters in contact with the fruit, a hopper for collecting the peel mounted to rotate with the carriage, a relatively fixed pan into which the hopper delivers the peel and having an outlet for the peel, and means for agitating the hopper as the carriage rotates to cause a movement of the peel down the hopper and out of the pan.

21. In a fruit peeling machine, the combination of a rotary carriage mounted to rotate on a vertical axis, a pair of cutters movably mounted on the carriage, means for effecting a relative movement of the fruit past the cutters, means for holding the cutters in contact with the fruit, a hopper corresponding to each cutter, guiding means for guiding the peel from each cutter into its hopper, and means for receiving the peel from the hoppers and directing the same out of the carriage.

22. In a fruit peeling machine, the combination of saddles for engaging the fruit on opposite sides, means for yieldingly pressing the saddles against the fruit, means for holding the fruit against rotation on its axis, means for effecting an advancing movement of the fruit past the saddles, and means located beyond the saddles with respect to the direction of advance of the fruit for removing the peel.

23. In a fruit peeling machine, the combination of saddles for engaging the fruit on opposite sides, means for yieldably pressing the saddles against the fruit, means for impaling the fruit to prevent rotation on an axis passing between the saddles, rotary peeling means for removing the peel from the fruit, and means for effecting a relative advancing movement of the fruit past the saddles and the peeling means.

24. In a fruit peeling machine, the combination of a pair of converging saddles for engaging the fruit on opposite sides, means for supporting the saddles and yieldably pressing the same toward each other, means for pressing the fruit forward between the saddles, means for impaling the fruit to prevent rotation of the same on its axis, and peeling means rotated beyond the saddles with respect to the direction of advance of the fruit.

25. In a fruit peeling machine, the combination of a guide ring, arms movably mounted on the ring to swing toward or from the axis of the ring, means for yieldingly pressing the arms toward each other, converging saddles carried respectively by the arms, means for advancing the fruit along the axis of the ring and between the saddles, means for impaling the fruit to prevent rotation on its axis, and rotary peeling means disposed beyond the saddles with respect to the direction of advance of the fruit.

26. In a fruit peeling machine, the combination of a guide ring, arms pivotally mounted on the ring to swing toward and from the axis of the ring, means for yieldably pressing the arms toward each other, converging saddles pivotally carried respectively by the arms, springs associated with the saddles for holding them in their converging relation, means for advancing the fruit along the axis of the ring and between the saddles, means for impaling the fruit to prevent rotation on its axis, and rotary peeling means disposed beyond the saddles with respect to the direction of advance of the fruit.

27. In a fruit peeling machine, the combination of a rotary table, a rotary peeling device having cutters mounted on the table to rotate on an axis, means for supporting the fruit and preventing its rotation on the said axis, means for rotating the table, a pusher stem, a guide for the pusher stem located in line with the said axis for guiding the stem to advance along the said axis, said pusher stem being capable of engaging the fruit and advancing the fruit past the cutters, said cutters having means for pressing the same inwardly toward said axis and into contact with the fruit, and means for limiting the inward movement of the cutters toward said axis.

28. In a fruit peeling machine, the combination of a rotary table, a rotary peeling device having cutters, mounted on the table to rotate on an axis, means for supporting the fruit and preventing its rotation on the said axis, means for rotating the table, said cutters having means for holding the same in contact with the fruit, means for advancing the fruit to move the same past the cutters and operating to eject the fruit from the peeling device after passing the cutters, and relatively fixed means for receiving the fruit when ejected.

29. In a fruit peeling machine, the combination of a rotary table, a tubular arbor supported on the table, a rotary peeling device mounted to rotate on the axis of the arbor, means for supporting the fruit and preventing its rotation on the said axis, cutters mounted on the carriage, means for rotating the table, means for holding the cutters in contact with the fruit, means for advancing the fruit to move the same past the cutters and through the tubular arbor, operating to effect the ejectment of the fruit from the peeling device after passing the cutters, and relatively fixed means for receiving the fruit when ejected.

30. In a fruit peeling machine, the combination of a rotary table, a tubular arbor mounted on the table, a rotary peeling device mounted on the arbor and including cutters for engaging the fruit, and means for supporting the fruit and advancing the same past the cutters of the peeling device and through the tubular arbor.

31. In a fruit peeling machine, the combination of a rotary table, a tubular arbor mounted on the table, a rotary peeling device mounted on the arbor and including cutters for engaging the fruit, means for supporting the fruit and preventing its rotation on its axis, and means for advancing the fruit to move the same past the peeling device and through the tubular arbor, and means for receiving the fruit from the tubular arbor.

32. In a fruit peeling machine, the combination of a rotary table, a rotary peeling device mounted on the table and including cutters for engaging the fruit, means for supporting the fruit over the peeling device, and a cam with means actuated thereby to advance the fruit past the cutters of the peeling device.

33. In a fruit peeling machine, the combination of a rotary table, a rotary peeling device mounted on the table and including cutters for engaging the fruit, means for supporting the fruit over the peeling device, a cam with means actuated thereby to advance the fruit past the cutters to the peeling device, said cam having means for effecting the completion of the movement of the fruit past the peeling device at a predetermined point in the rotation of the rotary table, and means for receiving the fruit from the peeling device.

34. In a fruit peeling machine, the combination of a rotary table, means for rotating the same about its axis, said table having an opening therein, a rotary peeling device mounted on the table to rotate substantially on the axis of said opening, and including cutters for engaging the fruit, means for supporting the fruit, a pusher stem cooperating with the same to advance the fruit and prevent its rotation, guiding means for the pusher stem located in line with the said axis for guiding the pusher stem to advance along the said axis, said pusher stem being capable of engaging the fruit and advancing the same past the cutter, and means for receiving the fruit when it passes through said opening.

35. In a fruit peeling machine, the combination of a rotary table, means for rotating the same on its axis, a tubular arbor mounted on the table, a rotary peeling device mounted on the table so as to rotate on the axis of the arbor, means for supporting the fruit, and for advancing the fruit past the cutters of the peeling device and operating to effect the completion of the movement of the fruit past the cutters and through the tubular arbor at a predetermined point in the rotation of the table, and receiving means located at said point to receive the fruit from the peeling device.

36. In a fruit peeling machine, the combination of a frame, a rotary table mounted to rotate on its axis and supported on said frame, a fruit holder carried by the upper part of the table, a rotary peeling device mounted to rotate on the axis of the holder and below the same, and having cutters for engaging the fruit, a cam supported on the frame above the holder, and means cooperating with the cam for advancing the fruit downwardly through the holder and past the cutters of the peeling device.

37. In a fruit peeling machine, the combination of a frame, a rotary table mounted to rotate on its axis and supported on said frame, a fruit holder carried by the upper part of the table, a peeling device mounted on the table below the fruit holder and having cutters for engaging the fruit, a pusher guided on the table for advancing the fruit through the holder and past the cutters of the peeling device, and a cam on the frame for actuating the pusher.

38. In a fruit peeling machine, the combination of a frame, a rotary table mounted to rotate on its axis and supported on said frame, a fruit holder carried by the upper part of the table, a peeling device mounted on the table below the fruit holder and having cutters for engaging the fruit, a pusher guided on the table for advancing the fruit through the holder and past the cutters of the peeling device, a cam on the frame for actuating the pusher, said cam having a toe for completing the movement of the fruit past the peeling device at a predetermined point in the rotation of the table, and means for receiving the fruit from the peeling device.

39. In a fruit peeling machine, the combination of a frame, a rotary table mounted to rotate on its axis and supported on said frame, a fruit holder carried by the upper part of the table, a peeling device carried by the table below the holder and having cutters for engaging the fruit, a pusher guide mounted on the table, a pusher mounted to slide on said guide along the vertical axis passing through the fruit holder, means for counter-balancing the pusher, and a cam cooperating with the pusher to advance the fruit down through the holder and past the knives of the peeling device.

40. In a fruit peeling machine, the combination of a frame, a rotary table supported on the frame, means for rotating the table on its central axis, a plurality of rotary peeling devices, means supported on the table for advancing the fruit past the peeling devices, and planetary driving mechanism for rotating the peeling devices on their axis, including a central driving wheel mounted on the axis of the table.

41. In a fruit peeling machine, the combination of a frame, a rotary table supported on the frame, means for rotating the table on its central axis, a plurality of fruit holders mounted on the upper part of the table, a plurality of tubular arbors mounted in the lower part of the table in axial alignment with the fruit holders, a rotary peeling device mounted on each arbor having a gear wheel coaxial with the same, a driving gear wheel mounted on the central axis of the table for rotating the peeling devices as the table rotates, means for actuating the driving gear wheel, each peeling device comprising a rotary carriage with cutter arms pivotally mounted on the same to swing in a plane transverse to the axis of the arbor, rotary cutters carried by the cutter arms, automatic means for rotating the rotary cutters as their carriages rotate, means for advancing the fruit down through the holders and past the cutters of the peeling devices and through the said arbors respectively, and means for receiving the fruit after it passes the peeling devices.

42. In a fruit peeling machine, the combination of mechanism for holding and peeling the fruit, means for forcing the fruit past the peeling mechanism, a knife beyond the peeling mechanism for dividing the fruit into halves, and holding means adjacent the said knife operating to guide the fruit while being divided by the knife.

43. In a fruit peeling machine, the combination of a carriage, fruit peeling cutters movably mounted on the carriage, means for holding the fruit and advancing the same down between the cutters, said carriage including a sleeve beyond the cutters and having a diametrically disposed knife for dividing the fruit into halves, and a pair of spring-pressed yokes on opposite sides of the said knife for guiding the fruit while the same is being divided.

44. In a fruit peeling machine, the combination of a pair of cutter frames, cutters carried thereby, means for holding and advancing the fruit between the cutters, means for pressing the cutters toward each other to hold the same in contact with the fruit, and means for holding the cutters apart thereafter to facilitate introducing another fruit between the cutters.

45. In a fruit peeling machine, the combination of a pair of cutter frames, cutters carried thereby, means for pressing the cutters toward each other to hold the same in contact with the fruit when passing between the cutters, a stop for holding the cutter frames apart temporarily, and automatic means for controlling the stop to move the same in or out of its operative position.

46. In a fruit peeling machine, the combination of a rotary table, a rotary carriage mounted thereon, a pair of cutter frames movably mounted on the carriage, cutters carried thereby, means for yieldingly pressing the cutter frames toward each other to hold the cutters in contact with the fruit when passing between the same, a movable stop for holding the cutter frames apart temporarily, and cams for controlling the stop and cooperating to separate the cutters and permit the cutters to approach each other at predetermined times.

47. In a fruit peeling machine, the combination of a pair of impaling blades adapted to cut into the fruit on opposite sides to hold the same against rotation, means for holding the fruit with its axis located on a line passing between said impaling blades, means for effecting a relative movement of the fruit and impaling blades along said line, and means located beyond the impaling blades with respect to the advancing movement of the fruit for removing the peeling from the fruit.

48. In a fruit peeling machine, the combination of a plurality of impaling blades disposed substantially radially from a central axis, means for holding the fruit and effecting a relative movement of the fruit and the blades along said axis, said blades operating to cut in a radial direction into the sides of the fruit to hold the same, and means located beyond the impaling blades with respect to the direction of advance of the fruit for removing the peeling of the fruit.

49. In a fruit peeling machine, impaling blades for engaging the side of the fruit, means for advancing the fruit past the impaling blades and for removing the peeling, said blades having corrugations extending in the direction of the advance of the fruit.

50. In a fruit peeling machine, the combination of means for engaging the fruit at two opposite points to support the same on an axis, a pair of impaling blades disposed on opposite sides of the axis and adapted to cut into the fruit to hold the same, means for effecting a relative movement of the fruit past the impaling blades, and means for removing the peeling from the fruit.

51. In a fruit peeling machine, the combination of means for engaging the fruit at two opposite points to support the same on an axis, a pair of impaling blades disposed on opposite sides of the axis and adapted to cut into the fruit to hold the same, and means for removing the peeling from the fruit, said impaling blades having corrugations extending longitudinally of the said axis.

52. In a fruit peeling machine, the combination of means for engaging the fruit at two opposite points to support the same on an axis, a pair of impaling blades adapted to cut into the fruit and located on opposite sides of the said axis, said impaling blades having corrugations extending longitudinally with said axis, means for producing a relative movement of the fruit and the said impaling blades along the said axis, and means for removing the peeling from the fruit during said movement.

53. In a fruit peeling machine for peeling elongated fruit, the combination of upper guiding and holding means for engaging the upper portion of the fruit when held at its upper portion, lower guiding and holding means for holding the lower portion of the fruit after the same has been peeled, said peeling mechanism operating to peel the upper portion of the fruit while held by the lower guiding and holding means, a pusher stem cooperating with the upper guiding means to advance the fruit while preventing its rotation, guiding means for the pusher stem located in line with the central axis of the peeling mechanism and guiding the pusher stem to move longitudinally along the said central axis of the peeling mechanism, said pusher stem being capable of engaging the fruit and advancing the same through the peeling mechanism.

54. In a fruit peeling machine for peeling elongated fruit, the combination of a peeling mechanism mounted for rotation about a central vertical axis, upper holding and guiding means above the peeling mechanism, lower holding and guiding means below the peeling mechanism, a pusher stem, guiding means for the pusher stem located in line with said central axis, said pusher stem cooperating with the upper guiding means to advance the fruit while preventing its rotation, past the upper holding means and past the peeling mechanism and into contact with the lower guiding and holding means.

55. In a peeling machine for potatoes or the like, a rotatable disk having a central opening, a plurality of shafts supported from the disk at one side face thereof, a cutting knife carried by the inner end of each shaft, and means yieldably urging the inner ends of the shafts toward the axis of the disk, shifting means for engaging a potato and for advancing the same axially of the disk, thereby moving the engaged potato past the cutting knife, means for rotating the shafts and disk, and means for actuating said shifting means.

56. In a fruit peeling machine, the combination of means for holding the fruit and preventing rotation thereof, a cutter, means for supporting the cutter in contact with the fruit and rotating the same around the fruit on an axis, and means located on the said axis for engaging the fruit and for maintaining contact with and advancing with the engaged fruit longitudinally along the said axis and past the cutter.

Signed at San Francisco this 18th day of September 1926.

HJALMAR GORANSON.
DAVID GORANSON.